United States Patent [19]
Alexandrovich et al.

[11] Patent Number: 4,758,491

[45] Date of Patent: Jul. 19, 1988

[54] DRY TONER AND DEVELOPER COMPOSITION

[75] Inventors: Peter S. Alexandrovich, Rochester; Paul A. Hartley, Spencerport; Joseph A. Pavlisko, Pittsford, all of N.Y.

[73] Assignee: Eastman Kodak Company, Rochester, N.Y.

[21] Appl. No.: 69,729

[22] Filed: Jul. 6, 1987

[51] Int. Cl.$^4$ .............................................. G03G 9/08
[52] U.S. Cl. ................................. 430/110; 430/109; 525/100
[58] Field of Search ................. 430/109, 110; 525/100

[56] References Cited

U.S. PATENT DOCUMENTS

| | | |
|---|---|---|
| 3,701,815 | 10/1972 | Matzner et al. . |
| 3,965,021 | 6/1976 | Clemens et al. ................ 430/109 |
| 4,051,077 | 9/1977 | Fisher ................ 430/110 |
| 4,332,715 | 6/1982 | Ona et al. ................ 524/265 |
| 4,517,272 | 5/1985 | Jadwin et al. ................ 430/110 |
| 4,565,773 | 1/1986 | Matrick ................ 430/110 X |

FOREIGN PATENT DOCUMENTS

| | | | |
|---|---|---|---|
| 53-16633 | 2/1978 | Japan ................ | 430/109 |
| 58-14143 | 1/1983 | Japan ................ | 430/109 |
| 59-197048 | 11/1984 | Japan ................ | 430/109 |
| 62-52564 | 3/1987 | Japan ................ | 430/110 |
| 1414159 | 11/1975 | United Kingdom . | |

OTHER PUBLICATIONS

Yilgor et al., *Polymer*, Dec. 1984, vol. 25, pp. 1800–1806.
Brandt et al., *Sampe Proceedings*, 30, pp. 959–971 (1985).
McGrath et al., *Makromol. Chem., Makromol. Symp.*, 6, pp. 67–80, (1986).
Noshay and McGrath, "Block Copolymers", Academic Press (1977), pp. 392–428.

*Primary Examiner*—Roland E. Martin
*Attorney, Agent, or Firm*—Bernard D. Wiese

[57] ABSTRACT

The image transfer properties and other properties of a fusible dry toner composition are improved by blending the binder resin of the toner with a multiphase polyorganosiloxane block or graft condensation copolymer which provides polyorganosiloxane domains of particular size and concentration at the toner particle surfaces.

13 Claims, No Drawings

DRY TONER AND DEVELOPER COMPOSITION

FIELD OF THE INVENTION

This invention relates to an electrostatographic dry toner composition and more particularly to such a composition containing a polyorganosiloxane block or graft copolymer which provides improved properties.

BACKGROUND

In electrostatographic imaging processes such as electrophotography and dielectric recording, developed images of polymeric toner powder are transferred electrostatically from one surface to another, for example, from a photoconductive, or dielectric surface to a receiving sheet of paper or plastic. This transfer is induced by the electrostatic attraction of charged toner particles from the first surface to the more strongly charged second surface. The electrostatic charging of the second surface (the receiving sheet) can be accomplished in various ways, such as by corona charging or by positioning the sheet between the first surface and an electrically biased pressure roller or plate. The strength of the field thus created causes the toner particles to transfer from the first surface, e.g., the photoconductor, to the second surface, e.g., the paper.

When a dry toner powder image is transferred electrostatically from one surface to another, certain defects can occur in the image. Defects, known as "hollow character", "halo", "mottle" and "flake" defects, can appear in the lines, alphanumeric characters or solid areas of the developed image. In the hollow character defect, the inner portions of the lines and alphanumeric characters contain less toner than the outer portions or not toner at all. Such defects are especially prevalent when the electrostatic transfer is accomplished by means of a biased pressure roller or plate.

To avoid the hollow character defect and related problems of image transfer, the addition of a low surface energy liquid such as silicone oil to dry toner compositions has been suggested by Jadwin et al in U.S. Pat. No. 4,517,272. In addition, U.S. Pat. No. 4,332,715 of Ona et al discloses the mixing of a vinyl resin with a small amount of a particular organopolysiloxane oil. According to the patent, these compositions were expected to be useful in toners for electrophotography but no indication is given of improvement in image transfer with such compositions.

In any event, although Jadwin et al disclose the improvement of image transfer by the use of silicone oils, it has been found that other problems occur with them. One is that the silicone liquids migrate from the toner and coat the carrier particles. This interferes with the triboelectric properties of the developer and leads to instability of the charge on the developer. As a result, the toner charge decreases and throw-off of toner increases. Another problem is that, as the silicone liquids exude from the toner binder, they aggregate as discrete particles on the toner particles in a non-uniform random distribution. This causes the toner image to be non-uniform. In addition, silicone liquids tend to leave an oil scum on photoconductive films.

Suggestions have also been made to incorporate other specific polysiloxane materials in toners, for purposes other than the improvement of image transfer. For instance, Japanese Patent No. 56-1060 of Noue et al, suggests that a toner composition having a binder composed of a particular silicon-containing copolymer resin and a silicon-free copolymer resin has good releasing properties with respect to rubber fixing rolls. French Patent No. 2,167,047 of Erhardt et al, discloses a toner composition comprising an A-B-A block copolymer wherein one of the sequences A and B is a hard amorphous polymer and the other is a soft amorphous or crystalline polymer. In one case, the hard polymer can be a styrene or a methylmethacrylate polymer and the soft polymer can be, among other things, a siloxane polymer. This composition is said to be pressure fixable.

BRIEF SUMMARY OF THE INVENTION

In accordance with the present invention, a new toner composition is provided which exhibits good charge stability and minimizes toner image transfer defects. Certain improved flow characteristics are also provided. The new composition is a marked improvement in these respects over compositions containing polysiloxane liquids as additives. It provides desirable toner surface properties through the use of an additive which does not exude undesirably from the toner composition.

The composition of the invention is an electrostatographic dry toner composition comprising (a) as a major component a normally solid fixable binder resin which is free of siloxane segments and (b) as a minor component a normally solid, multiphase thermoplastic condensation copolymer which contains a polyorganosiloxane block or graft segment.

DETAILED DESCRIPTION OF THE INVENTION

For convenience, the composition of the invention will be referred to as a modified toner composition which has two main components: (1) a major component (in terms of weight percent) which s a dry toner composition having properties such as chargeability and fixability that are normally required of toner compositions and (2) as a lesser component, an additive which markedly improves the image transfer and certain flow properties of the toner composition without adversely affecting its charging properties. This additive, identified broadly above as being a polyorganosiloxane condensation copolymer, will be illustrated in more detail hereinafter. First, however, the general characteristics of the major component will be mentioned.

The major component comprises a binder resin and, normally, also a colorant, a charge control agent and any other desired toner addenda. Such a combination can be like the many well known toner compositions which are used for developing electrostatic charge images. The binder can be any resin which has properties suitable for dry toners. Many such resins are known, but thermoplastic styreneacrylic copolymers and linear polyesters which are fixable by fusion are especially suitable. Other binder resins which are solvent fixable or pressure fixable, for example, are also useful.

The binder resin can comprise from about 70 to 100 weight percent of the major component. In other words, it can be the sole component of the unmodified toner composition or can be mixed with other toner components. In any event this major component, comprising the binder resin with or without addenda, makes up the main part of the novel modified toner composition of the present invention. In the latter, the polyorganosiloxane copolymer additive is present in a minor amount sufficient to produce toner particles having atomic ratios of silicon to carbon at the particle surfaces ranging from about 0.005 to 0.5 as measured by x-ray photoelectron spectroscopy, also known as XPS or ESCA (referred to hereinafter as ESCA), at a 38° electron take-off angle. Procedures for surface analysis are well known, being disclosed for example in the treatise "Practical Surface Analysis", Briggs et al, eds., John Wiley & Sons (1987) Chapter 9, and, specifically for siloxane copolymers, by Swight et al, "ESCA Studies of Polysiloxane-Polycarbonate/Polycarbonate Alloys", *Polymer Preprints*, 20(1), pp. 702–706 (1979). The sample degradation is minimized by using a monochromatized anode and a cold stage. To obtain such a surface ratio of silicon to carbon with a polyorganosiloxane copolymer additive which has the appropriate siloxane proportions, the amount of additive blended with the toner components, will be from about 0.5 to 12 parts by weight per 100 parts of the binder resin (abbreviated as pph).

The compositions of the invention are prepared by blending the binder resin, the siloxane copolymer and any other components before forming the toner particles. For example, the components can be melt blended and then solidified and pulverized, or a mixture of the binder resin and the siloxane copolymer in a common solvent can be spray dried to form blended toner particles.

The preferred method of preparation comprises melt blending a fusible toner binder polymer with a pigment, a charge control agent and the siloxane copolymer additive. The blend is solidified and then crushed and ground to the desired small particle size. The resulting particles contain the solid polyorganosiloxane copolymer in intimate contact with the binder resin.

The purpose of crushing and grinding the toner composition or of spray drying it is to reduce it to the form of finely divided particles or powder. Particles having an adverse diameter from about 1 to 30 $\mu$m were preferred. Larger or smaller particles can be used for particular methods of electrostatic image development.

The binder resin can be any flexible resin which has the physical properties that are required for a dry toner composition. By fixable is meant simply that the resin can be fixed or adhered to a receiving sheet such as paper or plastic. The most useful toner resins are fusible resins which are thermally fixable to the receiving sheet. However, the invention extends also to compositions which are otherwise fixable, such as solvent-fixable, pressure-fixable or self-fixable. These fixing techniques and resins suitable for them are well known in the art.

Many resins have been reported in literature as being useful as dry toner binders. These include vinyl polymers, such as homopolymers and copolymers of styrene and condensation polymers such as polyesters and copolyesters. Especially useful binder resins for the composition of the present invention are styrenic polymers of from 40 to 100 percent by weight of styrene or styrene homologs and from 0 to 45 percent by weight of one or more lower alkyl acrylates or methacrylates. Preferred are fusible styrene-acrylic copolymers which are covalently lightly crosslinked with a divinyl compound such as divinylbenzene as disclosed in the patent to Jadwin et al, U.S. Pat. Re. No. 31,072. Also especially useful are polyesters of aromatic dicarboxylic acids with one or more aliphatic diols, such as polyesters of isophthalic or terephthalic acid with diols such as ethylene glycol, cyclohexane dimethanol and biphenols. Examples are disclosed in the patent to Jadwin et al, above.

Fusible binder resins for the compositions of the invention have fusing temperatures in the range from about 50° C. to 200° C. so that the toner particles can readily be fused to paper receiving sheets. Preferred are resins which fuse in the range of from about 65° C. to 120° C. If the toner transfer is made to receiving sheets which can withstand higher temperatures, polymers of higher fusing temperatures can be used.

The colorant for the toner composition of the invention can be selected from a wide variety of dyes and pigments such as those disclosed, for example, in U.S. Pat. No. Re. 31,072. A particularly useful colorant for toners to be used in black and white electrophotographic copying machines is carbon black. The amount of colorant in the toner can vary over a wide range, for instance, from 1 to 20 weight percent of the toner. For some uses, no colorant is added to the toner, but normally from about 1 to 6 weight percent of colorant is present.

Other addenda can include charge control agents, those usually being ionic compounds such as ammonium or phosphonium salts. Suitable charge control agents are disclosed, for example, in U.S. Pat. Nos. 3,893,935; 4,079,014; 4,323,634 and British Patent Nos. 1,501,065 and 1,420,839. Only a small concentration of charge control agent is normally used in the toner composition, e.g., from about 0.1 to 3 weight percent and preferably from 0.3 to 1.5 weight percent.

The composition of the invention provides advantages in the electrostatic transfer of powdered toner images from one charged surface to another and the particular compositions of the two surfaces is not critical. For instance, the first surface can be an inorganic photoconductor such as a selenium drum or an organic photoconductive film such as disclosed in the patents to Light, U.S. Pat. No. 3,615,414 and Berwick et al, U.S. Pat. No. 4,175,960 or other types of photoconductive surfaces. Likewise, the second surface can be any of a variety of receiving surfaces such as sheets of paper or plastic or other chargeable non-conductive materials.

It is not essential that the first surface be a photoconductive material. it can be any charged surface that supports an electrostatically held toner pattern or image. This includes not only photoconductors but also dielectric plates as used in dielectric recording processes.

The block or graft copolymers which are the additives (b) in the toner compositions of the invention exhibit multiphase morphology, the term multiphase being used broadly to include two or more phases. These microscopic multiphase copolymers comprise a known class of segmented copolymers about which much has been written. See, for example, the paper by McGrath et al, "Kinetics, Mechanisms and Snythesis Studies of Difunctional Aminopropyl Terminated Polydimethylsiloxane Oligomers", Makromol. Chem., Makromol. Symp., 6, 67–80 (1986) and its extensive bibliography.

Although we do not wish to be bound by theoretical explanations of the mechanisms, it is believed that these block and graft copolymers have "hard" and "soft" polymer segments which yield distinct morphological phases linked by a chemical bond. It appears that valuable properties result from the microphase separation of the hard and soft segments into separate domains. One such property is that the hard segment evidently anchors the additive to the binder matrix while the organosiloxane soft segment provides the desired surface properties to the toner particles.

The hard segments or condensation polymer domains of the copolymer, when amorphous, have a glass transition temperature (Tg), or, when crystalline, have a crystalline transition temperature (Tm), in the range from about 0° to 150° C. The soft segments or polyorganosiloxane domains, when amorphous, have a Tg and, when crystalline, have a Tm, from about −130° to 0° C. In the preferred copolymers, at room temperature, the hard segment is below and the soft segment is above its transition temperature (Tg or Tm).

An important characteristic of the segmented copolymer additive is that when blended with the toner binder it provides a particular ratio of silicon to carbon at the toner particle surface. Thus, the incorporation with the toner binder of a block or graft organosiloxane condensation copolymer which provides a surface atomic ratio of silicon to carbon of 0.005 to 0.5 as measured by ESCA, distinguishes the compositions of the invention from prior art toners and forms a toner with improved image transfer and certain flow properties. To achieve this surface ratio of silicon to carbon, the concentration of the copolymer additive in the toner is correlated with the proportion of the siloxane segments in the copolymer and with the size of molecular weight of the siloxane segments. In the toner compositions of the invention the copolymer additive comprises from about 10 to 80 weight percent polyorganosiloxane and, preferably, from about 20 to 60 weight percent. The number average molecular weight (Mn) of the additive can range from about 10,000 to 200,000 with 20,000 to 150,000 being preferred. If the molecular weight is too low the additive tends to migrate and if too high, it is difficult to melt blend the additive with the toner. As for the organosiloxane segments, their molecular weights (Mn) can range from about 1,000 to 50,000, with 2,000 to 14,000 being preferred. The organosiloxane domains are of a generally circular shape when viewed by electron microscopy at the surfaces of freeze-fractured samples of the toner composition and have diameters ranging from about 10 to 3000 nm.

As the literature shows, block and graft copolymers having the desired polyorganosiloxane domains and having condensation polymer segments can be synthesized by reacting a polyfunctional organosiloxane oligomer, e.g., a diamino terminated oligomer, with condensation polymer monomers such as a diol and a dicarboxylic acid or acid halide or with a diisocyanate and a diacid. In this case the product is a random block copolymer. For greater regularity and control of the length of the condensation polymer chains the organosiloxane oligomer can be reacted with a condensation polymer oligomer. It is not alwasy suitable, however, e.g. in bulk or solution polymerization to carry out the reaction of two oligomers, so the reaction of the siloxane oligomer with condensation polymer monomers is usually preferred. In any event, the desired block or graft condensation copolymers can be obtained with any appropriately terminated organosiloxane oligomer, including silylamine and aminoalkyl terminated oligomers, and with appropriately terminated condensation polymer monomers or oligomers using the reaction techniques described in the treatise entitled "Block Copolymers" by Noshay and McGrath, Academic Press (1977), pages 392-428 and by Brandt et al, 30th national SAMPE Symposium, March, 1985, p. 959–970.

Although the polyorganosiloxane block or graft copolymer additive in the compositions of the invention can be any such copolymer which is compatible with the selected binder resin and which yields a toner having the polysiloxane domains that are described above, the preferred additives are block copolymers derived from certain α, ω-difunctional polyorganosiloxane oligomers. The latter are compounds of the general formula

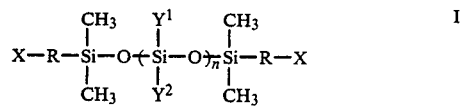

wherein:

X is a functional unit having an active hydrogen radical, such as —OH, —SH or —NHR', where R' is H or lower alkyl having 1-4 carbon atoms.

$Y^1$ is lower alkyl, $Y^2$ is lower alkyl or phenyl,

R is lower alkylene of 1 to 4 carbon atoms or phenyl, and n is an integer from about 10 to about 400.

Of the various organosiloxane oligomers that are suitable for preparing the block or graft copolymers, the preferred oligomers are bis(aminopropyl)terminated poly(dimethylsiloxanes). These are available in a series of molecular weights as disclosed, for example, by Yilgor et al, "Segmented organosiloxane copolymers" Polymer, 1984, V. 25, p. 1800–1806 and by McGrath et al, cited above. They are prepared, as described by McGrath et al, by the anionic ring opening equilibration polymerization of octamethylcyclotetrasiloxane in the presence of 1,3-bis-(3-aminopropyl)tetramethyldisiloxane and an initiator.

Other useful organosiloxane oligomers for preparing block copolymer additives for the compositions of the invention include silylamineterminated siloxane oligomers of the formula, $R_2NSiR_2O(R_2SiO)_xSiR_2NR_2$, wherein the radicals R are hydrocarbon groups, e.g., lower alkyl. These oligomers and block copolymers made from them by condensation with compounds having hydroxyl end groups are well knonw as disclosed, for example, in the patent to Matzner et al U.S. Pat. No. 3,701,815 and in the treatise by Noshay and McGrath, cited above.

Examples of condensation polymer blocks in the copolymers include poly(bisphenol A isophthalate) poly(bisphenol A terephthalate), poly(hexamethylene terephthalate), poly(bisphenaol A carbonate), poly(2,2,4,4-tetramethyl-1,3-cyclobutylene carbonate), poly(tetrabromobisphenol A carbonate), polybisphenol-A-azelate, A-azelate-co-isophthalate, poly(ethylene-co-2,2-norboinanaediyl-bis-4-phenoxyethanolter ephthalate) and various polyurethanes, polyimides, polyesteramides, polyureas and polysulfones as disclosed, for example, by Noshay et al, cited above.

A number of illustrative precursors for the block and graft copolymer additives have been described herein but others having equivalent properties can be used. The additives useful in the compositions of the invention are not limited to the specific copolymers that have been mentioned. The important requirement is that the additive be a block or graft organosiloxane condensation copolymer which has condensation polymer segments that are sufficient to retain the copolymer in the toner binder resin and which has organosiloxane segments of sufficient number and size to provide in the toner an ESCA atomic ratio of silicon to carbon in the range of from 0.005 to 0.5 and preferably from about 0.01 and 0.1. The organosiloxane domains of the additive preferably have diameters from about 10 to 3,000 nm.

Although the toner compositions of the invention are useful in all methods of dry development, including magnetic brush development, cascade development and powder cloud development, they are especially suitable for use in the magnetic brush method which employs a so-called two-component developer. This kind of developer is a physical mixture of magnetic carrier particles and of finely divided toner particles. The magnetic particles consist of magnetic materials such as iron, iron alloys, ferrites and the like which can be thinly or partially coated with a small amount, e.g., 1 ppm, a polymer such as fluorinated hydrocarbon resin to provide desired triboelectric properties. Usually, the carrier particles are of larger particle size than the toner particles, although in certain new and preferred developers the carrier particles are of about the same size as the toner particles. Useful carriers are disclosed, for example, in the patents to McCabe, U.S. Pat. No. 3,795,617; Kasper, U.S. Pat. No. 3,795,618 and U.S. Pat. No. 4,076,857; and Miskinis et al, U.S. Pat. No. 4,546,060.

One of the useful properties of the toner composition of the present invention is that the developer in which the toner is present maintains a relatively stable electrostatic charge during the development process. An indication of this is that the amount of toner "throw-off" during development is low. This means that the toner particles keep a high charge and do not separate readily from the oppositely charged carrier particles and are therefore not thrown off and lost from the system until they are attracted by the more strongly charged photoconductor. Other advantages of the new compositions, besides improved toner transfer with reduced image defects, include satisfactory triboelectric properties, good dispersion quality, reduced toner cohesiveness and adhesiveness and increased life of the developer. The latter property results in reduced adhesion to the carrier and to the walls of the toner containers which provides improved toner flow.

Examples 1–6 which follow illustrate the preparation of organosiloxane copolymers which are useful in the compositions of the invention. The copolymer structures shown in the formulae are idealized and merely indicate the types and relative amounts of the different segments.

EXAMPLE 1: Random Block Coppolymer

An α,ω-bis(aminopropyl)polydimethyl siloxane oligomer,

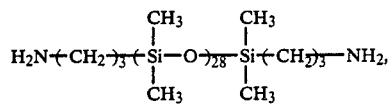

was prepared by equilibrating cyclic octamethyltetrasiloxane with 1,3-bis(γ-aminopropyl)tetramethyldisiloxane in bulk using alkaline catalysts, substantially as described by Yilgor et al, POLYMER, December 1984, Vol. 25, p. 1800–1806. A siloxane-bisphenol A-adipate polyester was synthesized by reacting this siloxane oligomer with bisphenol A and adipic acid chloride in the presence of a phase transfer catalyst, substantially as described for the synthesis of random block copolymers by Brandt et al, SAMPE Proceedings, 30, 959–971 (1985). A random block copolymer, poly(bisphenol A-adipate-block 40 weight percent polydimethylsiloxane), was obtained of the nominal formula:

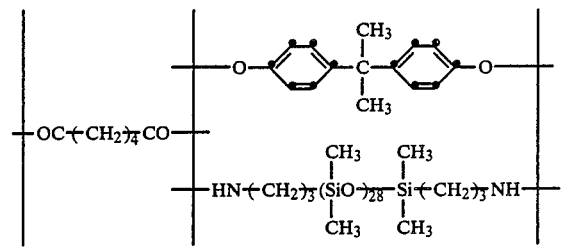

EXAMPLE 2: Random Graft Copolymer

To a 100 ml polymerization flask was charged 40 g of a multifunctional organosiloxane oligomer, namely, α,ω,δ-aminopropyl poly(dimethyl-comethoxy-δ-aminopropyl siloxane) and 60 g of the copolyester, poly(ethylene-co-2,2-norbornanediylbis-4-phenoxyethanol terephthalate). The contents of the flask were heated under a nitrogen atmosphere to 220° C. and a Claisen head attached. The mixture was heated at 220° C. for two hours followed by one hour at 240° C. The flas was then attached to vacuum, 100μ, and heated with stirring at 240° C. for three hours. A random graft copolymer of the following nominal formula was obtained:

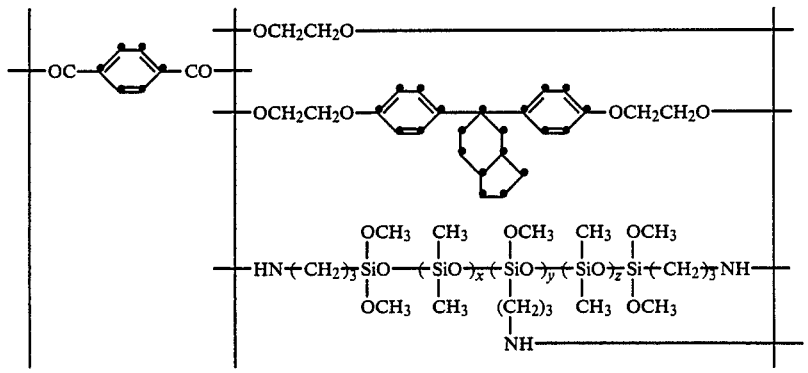

An α,ω-bis(aminopropyl) organosiloxane oligomer like that of Example 1, but of higher molecular weight (approximately 200 dimethylsiloxane units in Examples 3, 4 and 5 and approximately 100 dimethylsiloxane units in Example 6) was used to prpare four additional block copolymers with polyester, polyamide or polyurethane linkages. In Examples 3, 4 and 5, random blocks of polyesteramide resulted from using monomers (diol and diacid) to react with the amine-terminated siloxane oligomer, as described by Brandt et al, supra. In Example 6, an alternating block copolymer was prepared by reacting the hydroxyl-terminated polyester oligomer and the secondary amine-terminated siloxane oligomer with tolylene diisocyanate by the procedure of Yilgor et al, supra. The resulting block copolymers are indicated by the following nominal formulae:

Example 6:

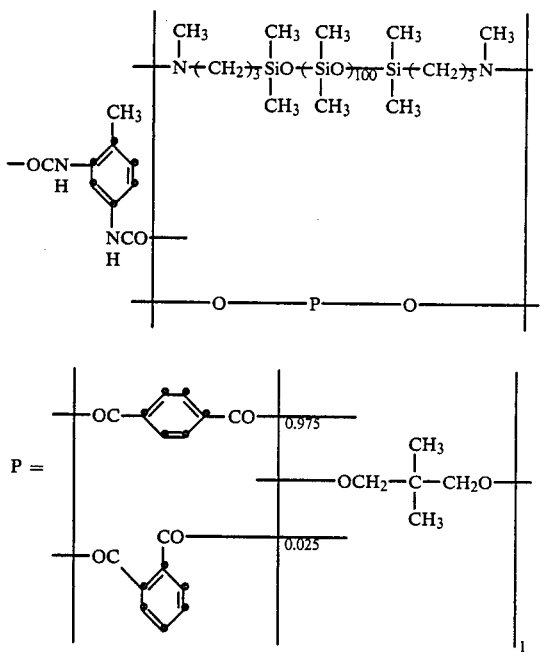

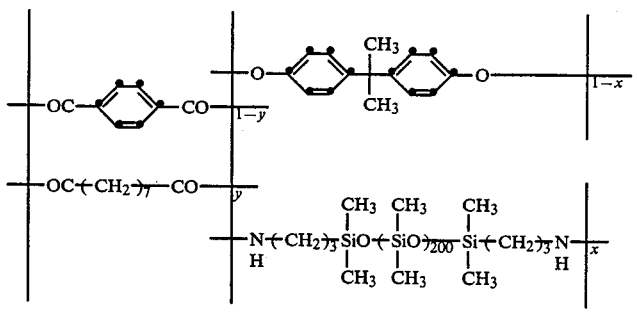

Example 4:

Example 5:

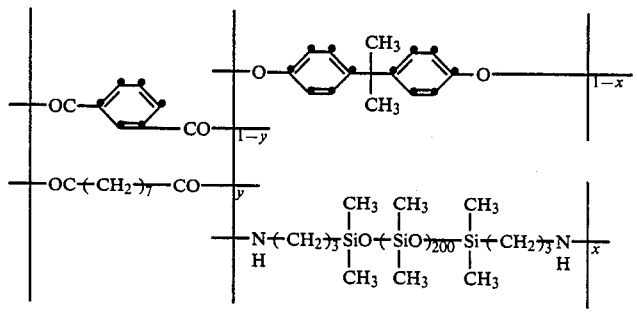

While 2,4-tolylene diisocyanate was used in Example 6, any organic dissocyanate such as, 4–4'-diphenylmethane diisocyanate, 4,4'-dicyclohexyl methane diisocyanate, 1,6-hexamethylene diisocyanate, 1,4-cyclohexane diisocyanate, 1,6-napththalene diisocyanate and the like may be used to obtain copolymers which when employed in toner compositions give comparable resuls.

The examples which follow illustrate the preparation and testing of toner compositions of the invention and of control toner compositions.

BINDER RESIN AND CONTROL TONER PREPARATION EXAMPLE

The binder resin was a copolyester formed by bulk polymerization of 87 parts by weight of dimethylterephthalate oligomer, 13 parts dimethyl glutarate, 95 parts 1,2-propanediol and 5 parts glycerol. The resulting copolyester in the amount of 100 parts by weight was mixed with 5 parts carbon black ("Regal 300"carbon black, a product of Cabot Corp.) and 1 part of the charge control agent, methyltriphenyl phosphonium tosylate. The mixture was melt blended on heated compounding rolls at 130° C. for 20 minutes. The resulting blend was cooled and allowed to solidify and then was crushed into coarse particles. It was then pulverized in a fluid energy mill of the type disclosed in U.S. Pat. No. 4,089,472 to an average particle size of about 12 μm.

The procedure used in preparing the control toner composition above, was followed except that when melt blending the compositions, a polydimethylsiloxane (abbreviated as "PDMS") block copolymer was included in the blend.

DEVELOPER PREPARATION AND IMAGE TRANSFER EXAMPLE

Several toner compositions were prepared as above with selected concentrations of the PDMS block copolymers. Table I below identified the particular PDMS copolymer and its concentration in each toner composition. The toner compositions were mixed with magnetic carrier particles to form developer compositions. The carrier particles were ferrite particles with a thin coating of a fluorocarbon resin ("Kynar" resin of Pennwalt Corp.), the carrier being of the type described in Miskinis et al, U.S. Pat. No. 4,546,060. The resulting developers were then used in image transfer tests of the toners. The tests were carried out in a laboratory electrophotographic copying apparatus having an organic photoconductor film, a magnetic brush developing station and a biased roller transfer station for transferring the toner image from the photoconductor film to sheets of bond paper. Table I records the results of the tests of each toner composition of the invention and of the control composition which contained no PDMS additive.

TABLE I

| Additive Present in Toner Composition | Concen. pph | PDMS Block, Mn | Hollow Character Defects |
|---|---|---|---|
| None (Control) | 0 | — | severe |
| Example 1 | 1.5 | 2,500 | less severe |
| " | 3 | " | moderate |
| " | 6 | " | slight |
| " | 12 | " | none |
| None (Control) | 0 | — | severe |
| Example 2 | 3 | 13,000 | moderate |
| " | 4.5 | " | slight |
| " | 6 | " | none |

Table I shows the improvement in image transfer which results from the incorporation of the PDMS copolymer additive in the toner. Table I also shows that the additive having the longer PDMS block length is somewhat more effective in reducing the hollow character defect. Its dispersions in polyester binder resin, however, are slightly hazier than those of the shorter block polymer. It should also be understood that these toner compositions were very thoroughly melt blended. For reasons that are not fully understood, it appears that when the polyorganosiloxane additive is blended less homogeneously with the toner resin, somewhat lower concentrations of the additive in the toner resin are effective in eliminating the hollow character defects.

The next sample describes a further test of the toner compositions of the invention and of a control composition.

THROW-OFF TEST EXAMPLE

Polyester toner compositions were prepared as above to include a control composition containing no polysiloxane additive and containing either the PDMS copolymer of Example 3 or that of Example 4. Developers formed by mixing the toners with ferrite carrier particles thinly coated with fluorocarbon resin were then tested for "throw-off" or dusting. In this test, the developer is placed in a magnetic brush developer station which is connected by way of a filter to a vacuum source. As the magnets of the brush rotate and agitate the developer, any tone which separates from the carrier is drawn off by the vacuum and collects on the filter. The weight of toner on the filter after a selected period of time shows the extent of dusting or "throw-off" of toner. To simulate long life developer behavior, the developers were tested under three different conditions:

(1) Fresh developer: the developers are prepared at an initial toner concentration of 15 weight percent (15% TC) and tested without prior use.

(2) Exercised developer: before testing the developer at 10.5% TC is exercised for 5 minutes by tumbling in a glass bottle placed in the rotating magneti field (2,000 rpm) of a magnetic brush developing station.

(3) Replenished developer: before testing, a 10.5% TC developer is exercised for 5 minutes as in condition 92) and is then replenished with fesh toner to 15% TC.

The results of the tests of these different developer compositions which were subjected to the indicated conditions before being tested for throw-off in the magnetic brush, were as follows:

| Additive Contained in the Toner | Pre-test Condition of the Developer | Throw-Off (mg) |
|---|---|---|
| None (Control) | 1 | 1.9 |
| " | 2 | 3.5 |
| " | 3 | 128.3 |
| Example 1 | 1 | 0.5 |
| " | 2 | 0.2 |
| " | 3 | 99.1 |
| Example 2 | 1 | 0.2 |
| " | 2 | 0.6 |
| " | 3 | 37.0 |

These results show that under each condition of exercise of the developer, the toner throw-off with the compositions of the invention was substantially less. These same toner compositions were also measured for their charge to mass ratio after being triboelectrically charged in contact with the carrier. The measurements showed that the compositions of the invention maintained relatively stable charge and were at least as good as the control compositions in this regard. This coupled with the marked improvement in image transfer, shows the unexpected superiority of the compositions of the invention over the controls. In other words, the toners of the invention provide improved image transfer without loss of charging qualities.

The next example describes the image transfer testing of toners containing the additives of Examples 3-6.

IMAGE TRANSFER EXAMPLE

Each of the 40 weight percent PDMS polyester-block-polydimethylsiloxane copolymers of Examples 3-6 was melt blended at 150° C. at a concentration of 4 pph with the polyester binder resin previously described and other toner components. With the additives of Examples 3-5, the colorant was a cyan pigment, bis(phthalocyanylalumino) tetraphenyldisiloxane (4 pph) and with the Example 6 additive the colorant was carbon black at 5 pph. in these samples, the charge control agent was dimethylbenzylstearyl ammonium m-nitrobenzenesulfonate (1 pph for Examples 3-5 and 1.5 pph for Example 6). After mixing with the previously described ferrite carrier at 15 weight percent TC, the resulting developers were tested for image transfer in the electrophotographic copying apparatus equipped with a magnetic brush development station and a roller transfer station. The results of the toner image transfer to bond paper, were as follows:

TABLE II

| Toner Additive | Mn of Additive | Transfer Properties | |
|---|---|---|---|
| | | Hollow Character | Efficiency |
| Example 3 | 28,000 | good | excellent |
| Example 4 | 39,000 | good | excellent |
| Example 5 | 29,000 | good | excellent |
| Example 6 | 10,000 | good | excellent |

In each of these tests the hollow character defects were virtually eliminated. Transfer efficiency (defined as percent toner transferred from the photoconductor) was also excellent. It should be noted that the additive of Example 4 is a derivative of terephthalic acid and azelaic acid while the additive of Example 5 is a derivative of isophthalic acid and azelaic acid. The relative amounts of the two types of acids is not critical. The ratios can be varied without significantly changing the properties of the additive.

The next example demonstrates further properties of the compositions of the invention.

AGGREGATION TEST EXAMPLE

The block copolymer additive of Example 3 was used in formulating toners as with the Examples 3-5 additives of the Image Transfer Example, above, except that the toners were melt compounded in a heated screw extruder at 120° C. The resulting toners were subjected to several tests, including imaging tests in the electrophotographic copying machine, in comparison with a control composition containing no PDMS additive. Results are shown in Table III.

TABLE III

| Additive | Concen. of Additive, pph | Aggr. Defects Per Copy | Toner Adhesiveness | Toner Cohesiveness | Surface Siloxane; Si/C |
|---|---|---|---|---|---|
| None (Control) | 0 | 8 | High | High | 0 |
| Example 3 | 2 | 2 | Reduced | Medium | 0.025 |
| Example 3 | 4 | 0.1 | Reduced | Low | 0.050 |

These results indicate that the additive improves image quality by reducing the cohesiveness and aggregation of the toner particles. Higher concentrations of the additive are more effective as more siloxane is present on the toner surface as indicated from ESCA and surface wettability measurements. As a result of the lower adhesiveness the toner and developer flow more easily and toner is less likely to stick to the walls of the toner container and other surfaces of the copying apparatus. The aggregate defects referred to in Table III results from aggregatio of toner particles into relatively large flakes. These prevent contact of the transfer roller with the copy paper in the area around each flake and cause white spots in toned areas of the transferred image.

The invention has been described in detail with particular reference to preferred embodiments thereof, but it will be understood that variations and modifications can be effected within the spirit and scope of the invention.

We claim:

1. An electrostatographic toner composition comprising
   (a) as a major componeont, a fixable binder resin which is free of siloxane segments, and
   (b) blended therewith as an additive and as a minor component, an organosiloxane multiphase condensation copolymer having a polyorganosiloxane block or graft segment, said polyorganosiloxane segment comprising from about 10 to 80 weight percent of the additive and the amount of said additive being sufficient to provide a blended composition having a surface atomic ratio of silicon to carbon in the range from about 0.005 to 0.5.

2. A composition according to claim 1, wherein the polyorganosiloxane component has polyorganosiloxane domains having maximum diameters of from about 10 to 3,000 nm.

3. A composition according to claim 2, wherein the amount of said additive (b) is from about 0.5 to 12 parts by weight per hundred parts of the fusible binder resin (a).

4. A composition according to claim 3, wherein the condensation polymer segment of the multiphase copolymer has a glass transition temperature (Tg) in the range from about 0° to 150° C. and the polyorganosiloxane segment has a glass transition temperature (Tg) in the range from about −130° to 0° C.

5. A composition according to claim 1, wherein the condensation polymer segment comprises a polyester.

6. A composition according to claim 1, wherein the condensation polymer segment comprises a polyurethane.

7. A composition according to claim 6, wherein the polyurethane is a polyesterurethane.

8. A composition according to claim 1, wherein the polyorganosiloxane segment is a polydimethylsiloxane segment.

9. A composition according to claim 8, wherein the polyorganosiloxane segment is derived from an α,ω-bis-(aminopropyl)polydimethylsiloxane oligomer.

10. A composition according to claim 1, wherein the binder resin is a thermoplastic polyester.

11. An electrophotographic developer composition comprising a mixture of magnetic arrier particles and a toner composition of claim 1.

12. An electrophotographic developer composition comprising a mixture of resin-coated ferrite particles and a toner composition of claim 9.

13. An electrophotographic developer composition comprising a mixture of magnetic carrier particles and a toner of claim 4, wherein the binder resin is a polyester and the additive is of number average molecular weight from about 10,000 to 200,000 and comprises from about 20 to 60 weight percent polydimethylsiloxane.

* * * * *